United States Patent Office 3,030,320
Patented Apr. 17, 1962

3,030,320
ORGANIC TITANIUM COMPOUNDS
John H. Haslam, Landenberg, Pa., assignor to E. I. du Pont de Nemours and Company, Wilmington, Del., a corporation of Delaware
No Drawing. Filed July 5, 1955, Ser. No. 520,135
6 Claims. (Cl. 260—18)

This invention pertains to organic compounds of titanium and zirconium. More particularly, it relates to a novel process for preparing organo polytitanyl acylates and organo polyzirconyl acylates and to new and useful compounds which may be formed by this process. This application is a continuation-in-part of my co-pending application, Serial No. 337,439, filed February 17, 1953, now abandoned.

Within recent years, organic compounds described as polytitanyl acylates and polyzirconyl acylates have been developed. Their methods of preparation are disclosed in U.S. Patents 2,621,193 and 2,621,195, and in my co-pending application Serial No. 407,609, filed February 1, 1954, now abandoned. These compounds are characterized by the polytitanyl or polyzirconyl structure of metal-oxygen chains which may be either straight chains, branch chains, or cyclic chains or combinations of these structures. Also attached to the metal through oxygen are hydrocarbon groups and acyl groups. The unit on which these compounds are based may be represented as follows:

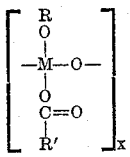

where M is a metal selected from the group consisting of titanium and zirconium, and R is a hydrocarbon group and R' is an aliphatic hydrocarbon group.

By the procedure given in U.S. Patent No. 2,621,195, one mol of tetraisopropyl titanate, one mol of stearic acid and one mol of water will give one mol of isopropoxy polytitanyl stearate and 3 mols of isopropanol. The co-product, isopropanol, is removed from the reaction mixture by distillation. However, for many compounds such a process is impractical, particularly if the co-product alcohol is non-volatile or has a high boiling point which prevents it from being readily separated from the desired polytitanyl or polyzirconyl acylate. The alternative procedure given in U.S. Patent No. 2,621,193 often gives co-products equally difficult to remove.

By the process of this invention, the aforementioned polytitanyl and polyzirconyl acylates, which were previously difficult to obtain, may be easily and economically produced. Furthermore, new and useful products may also be obtained by my novel process. The reaction involved is essentially an alcoholysis. For example, when an alkoxy polytitanyl acylate is used as a starting material and it is commingled with an alcohol, the reaction may be illustrated by the equation

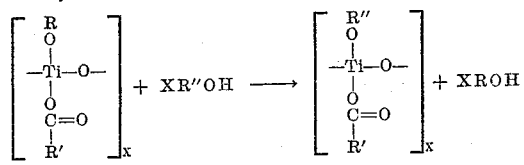

where R and R' are alkyl groups and R" is an organo group.

It is an object of this invention to provide a novel process for producing organo polytitanyl acylates and organo polyzirconyl acylates of improved chemical stability. It is another object of this invention to produce new co-polymers useful for coating compositions or plastic substances. It is still another object to produce new compounds useful as water repellents and fungicides. These and other objects of this invention are accomplished by the aforementioned alcoholysis which is hereinafter described in more detail.

As previously mentioned, the organo polytitanyl acylates and the corresponding zirconium compounds which are the starting materials in this invention are usually represented as follows:

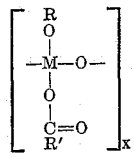

From the above formula, it will be noted that the compounds are characterized by three different chemical groups:

(1) The basic polytitanyl or polyzirconyl structure of metal-oxygen chains —M—O— which repeat to form linear, branched, and cyclic chains and combinations of these structures.

(2) The organo group R which is bonded to the metal through oxygen at an oxo free carbon atom. These organo groups are hydrocarbon radicals and halogenated hydrocarbon radicals of preferably not more than 8 carbon atoms.

(3) The third group is an acyl group

such as stearoyl, which is bonded through oxygen to the titanium or zirconium atom.

A typical useful starting material would be isopropoxy polytitanyl stearate

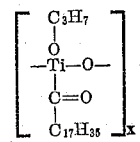

In the process of this invention, the isopropoxy polytitanyl stearate is reacted with an alcohol or phenol, and the isopropoxy group (C₃H₇O—) is replaced by the RO— group of the alcohol or phenol thereby forming a different, and usually a larger and more complex, compound. The product of the process is therefore a different or modified organo polytitanyl acylate or corresponding zirconium compound in which the improved properties are due to the new organo group.

In one preferred adaptation of the invention isopropoxy polytitanyl stearate in hexane or other suitable organic solvent is intimately mixed with stearyl alcohol in a reaction vessel equipped for distillation. The mixture is then heated to dissolve the stearyl alcohol and effect removal by distillation of the coproduct isopropanol formed in the reaction. The final reaction product comprises stearoxy polytitanyl stearate in hexane solution. The alcoholysis is an equilibrium reaction which is forced to completion in the desired direction by removal of the isopropanol. The solvent is not necessary to the reaction in many cases, but it often assists in providing fluidity thus making contact between the reactants easier and shortening the over-all reaction time. In some cases, it is not necessary to remove the co-product alcohol or the solvents. For example, when products of this invention are to be used in coating compositions, the reaction mixture may be applied to the surface to be coated, and the alcoholysis reaction would proceed to completion as the co-product alcohol evaporates. This method is particularly suitable with co-polymers produced by the reaction of alkoxy polytitanyl acylates or alkoxy polyzirconyl acylates with polyhydroxy compounds such as alkyd resins where the co-polymer is to be used as a coating material.

In another preferred adaptation of this invention, the alkoxy polytitanyl acylates are reacted with alcohols and phenols having in addition to characteristic hydroxyl groups another oxygen-containing group or an amino group which is adapted to form a chelate ring with the metal atom. These alcohols and phenols react as previously disclosed to displace the alcohol corresponding to the alkyl group in the initial alkoxy polytitanyl acylate. For a clearer understanding of the formation of the chelate compounds, I refer to the following equation which depicts the replacement of an alkoxy group on a polytitanyl acylate unit by ethanolamine.

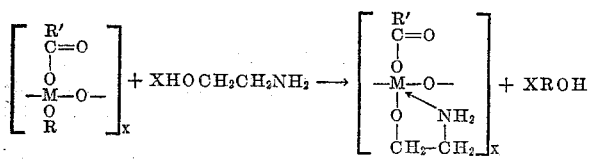

In a similar manner, a polyhydroxy alcohol, such as ethylene glycol, may also form a chelate ring.

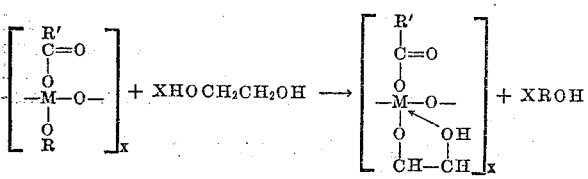

However, it is also possible for the other hydroxyl groups to enter into the alcoholysis reaction and cross link the starting polytitanyl or polyzirconyl acylate. This is accomplished by choosing the reacting proportions so that the polyhydroxy compound supplies approximately one OH group for each OR group on the acylate. By continued removal of the co-product alcohol, the equilibrium of the reaction is shifted so that the second hydroxyl group on the polyhydroxy compound undergoes alcoholysis, and as a result, there are no remaining hydroxyl groups which can form a chelate ring. These products are novel, and they are generally referred to as co-polymers. An example of these co-polymers is shown in Example 5.

The chelating radicals may be used in the manner shown in the above equation to displace any or all of the RO groups in the acylate. Stability and resistance to hydrolysis will increase as the displacement and substitution becomes more nearly complete. These reactions are quite spontaneous and usually exothermic because of the marked stability of the chelated product. In order to form a chelate ring the oxygen-containing or amine group must be so situated with respect to the hydroxyl group in the chelating alcohol or phenol so as to form with the metal a 5 or 6 atom chelate ring. The amino organo polytitanyl acylates prepared by this method may also be reacted with organic acids or mineral acids to form the corresponding amine salts having further novel properties.

In a more specific embodiment, one mol of an alkyl orthoester of titanic acid is reacted with slightly less than one mol of water and with from ½ to 1½ mols of a fatty acid to produce the corresponding alkoxy polytitanyl acylate. This reaction may be suitably carried out in hydrocarbon solvents and the resulting polymeric product isolated for further treatment, or it may be reacted in accordance with this invention while still in the preparative solution. This alkoxy polytitanyl acylate compound is then reacted with a critically substituted hydroxy compound capable of forming a chelate with the metal atom by displacing alkoxy groups from the initial alkoxy polytitanyl acylate and thereafter chelating with the titanium atom through the coordinating group in the manner heretofore described.

In still another embodiment of this invention, the organo polytitanyl or polyzirconyl acylate, preferably the alkoxy polytitanyl acylates, are reacted with a halogenated phenol or a halogenated aromatic alcohol to produce a new series of compounds useful as fungicides. For example, isopropoxy polytitanyl stearate may be reacted with pentachlorophenol in the manner shown to produce a valuable fungicide:

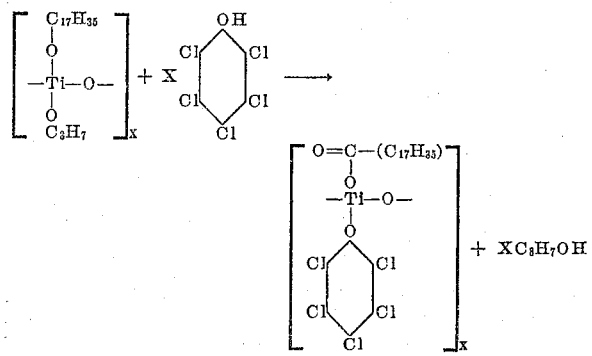

The organo polytitanyl acylates and the corresponding zirconium compounds useful as starting materials for the invention are disclosed in U.S. Patent Nos. 2,621,193 and 2,621,195 and in my co-pending application Serial No. 407,609, filed February 1, 1954. These compounds are represented by the following unit formula:

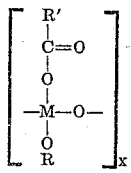

where R and R' are organo groups preferably alkyl groups of not more than 8 carbon atoms and M is titanium or zirconium. The complete molecular structures which the above unit formula represents empirically is not definitely known, but the number of RO— and

groups per Ti or Zr atom can be determined. For purposes of this invention, the organo, or RO— group, may vary between 0.1 to 1.9 per metal atom with the preferred range being between 0.5 and 1.5 per Ti or Zr. The acylate groups may vary between 0.1 to 1.9 per metal atom, and the preferred range is between 0.5 and 1.5 per metal atom. Partial hydrolysis of the alkoxy polytitanyl acylates by which some of the alkoxy group are replaced by hydroxy groups does not hinder the usefulness of such compounds in this invention since the remaining alkoxy group may be readily replaced during the alcoholysis reaction. It is preferred to keep the OH groups below about 0.5 per Ti or Zr atom. However, more hydroxyl groups may be present since inoperability will result only when there are no RO— groups to take part in the reaction.

The acyl groups,

present in the starting titanium and zirconium compounds are derived directly from organic carboxylic acids, preferably the mono-carboxylic acids having from 4–22 carbon atoms. Examples of these acids are butyric, acrylic, lauric, stearic, oleic, linoleic and the like; substituted fatty acids such as ricinoleic and phenyl stearic acid; aryl carboxylic acids such as benzoic and cinnamic; and the natural mixtures of acids derived from animal fat, fish oil, tall oil, linseed oil, soybean oil and cocoanut oil. The remaining organic groups, R, in the starting material (i.e., the alcoholizable groups) are haloalkyl or hydrocarbon radicals having from 1–8 carbon atoms. Examples of the former type radicals are chloromethyl bromoethyl, and the hydrocarbon groups are exemplified by aryl, alkaryl, aralkyl and alkenyl groups. The preferred organo groups are alkyl groups, such as methyl, ethyl, isopropyl butyl and octyl.

Examples of the organo polytitanyl and polyzirconyl acylates useful as reactants include: isopropoxy polytitanyl stearate, isopropoxy polyzirconyl stearate, isopropoxy polytitanyl oleate, isopropoxy polyzirconyl oleate, isopropoxy polytitanyl palmitate, isopropoxy polyzirconyl palmitate, isopropoxy polytitanyl caprylate, isopropoxy polyzirconyl caprolate, methoxy polytitanyl stearate, ethoxy polytitanyl oleate, butoxy polytitanyl laurate, butoxy polyzirconyl laurate, methylphenoxy polytitanyl stearate, methylallyloxy, polytitanyl oleate, and isopropoxy polytitanyl acylates made in the same manner as isopropoxy polytitanyl stearate except that mixtures of fatty acids derived from sources such as linseed, soya, fish, and cocoanut oils are used instead of pure stearic acid. Other examples include the compound of Example V of U.S. Patent No. 2,621,193. This material is represented by the formula:

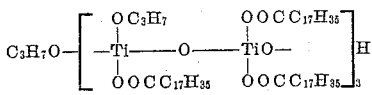

and this material analyzed as follows:

| | | |
|---|---|---|
| Ti | percent | 9.25, 9.40 |
| C | do | 66.23, 66.15 |
| H | do | 10.80, 10.77 |
| N | do | 0.11, 0.06 |
| Mol. wt | | 2,730, 2,880 |

Another suitable material is that of Example VI of the same patent. This material may be represented by the following formula:

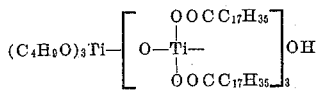

and its analysis corresponds to

| | | |
|---|---|---|
| Titanium | percent | 9.10, 9.04 |
| Carbon | do | 66.19, 66.10 |
| Hydrogen | do | 10.76, 10.74 |
| Mol. wt | | 2,360, 2,290 |

Also suitable is the product which corresponds in analysis to the following formula:

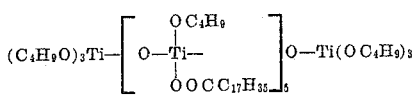

and its analysis is

| | | |
|---|---|---|
| Ti | percent | 12.70, 12.68 |
| C | do | 61.26, 60.78, 61.03 |
| H | do | 10.20, 10.44, 10.16 |
| Mol. wt | | 2,720, 2,500 |

Substantially any organo soluble alcohol or phenol may be used in this invention to react with the organo polytitanyl acylates and their corresponding zirconium compounds to replace their alcoholizable organo groups. In instances where a non-chelating alcohol or phenol is used, it is easier to bring about the reaction if the reactant alcohol has a higher boiling point than the product alcohol; however, it is possible to react lower boiling alcohols although the removal of the by-product alcohol may be somewhat more difficult. The useful reactive hydroxy compounds include such monohydroxy aliphatic alcohols as butyl, amyl, hexyl, octyl, decyl, lauryl, n-tetradecyl, cetyl, and stearyl alcohol, and isomers and mixtures thereof; unsaturated alcohols such as allyl and substituted allyl alcohols such as methylallyl, crotyl, and oleyl alcohols; aliphatic polyhydroxy alcohols such as ethylene glycol, propylene glycol and hexamethylene glycol; alicyclic alcohols such as cyclopentanol, cyclohexanol; aromatic alcohols such as beta-phenyl-ethanol, benzyl alcohol, methylbenzyl alcohol, cinnamyl alcohol; phenol, cresol, naphthol and halogenated phenols and halogenated aromatic alcohols such as p-fluorophenol, p-chlorophenol, p-trifluoromethyl phenol, pentachlorophenol, 4-chloro-m-cresol, 2,4-dichloro-1-naphthol, 1,6-dibromo-2-naphthol, p-chlorobenzyl alcohol, trichloromethyl phenol, chloromethyl tetrachlorophenol, trichlorophenol, 2,4,6-trichloro-3-methyl phenol, chloro-m-xylol, chlororesorcinol, chlorocarvacrol and p-iodophenol. The halogens including fluorine, chlorine, bromine, and iodine, may be substituted in any position on the halogenated phenol or halogenated aromatic alcohol. Also included within the scope of the invention are the high-molecular-weight hydroxyl-containing organo soluble resins, such as phenol formaldehyde resins, glycerol phthalic anhydride polyester resins; oil modified alkyd resins, and epoxy resins. The organo soluble OH containing polymers, such as the partially hydrolyzed polyvinyl esters and secondary cellulose acetates and mixtures of these various hydroxy compounds are also contemplated.

The hydroxy compounds which are especially valuable in forming the organo chelated acyl polymetalate products are those alcohols and phenols which contain, in addition to the reactive hydroxyl group, certain groups which will form coordinate bonds with the metal atom. In the case of the alcohols these coordinating groups may be an amino group, another hydroxyl group, or an oxo group, and these groups may be separated from the reactive hydroxyl group by 2 or 3 carbon atoms. In the case of the phenols, the coordinating groups when attached to the aromatic nucleus include amino, hydroxyl, carbonyl, 1-hydroxylalkyl and tertiary-aminomethyl, and they should be in the ortho position relative to the reactive hydroxyl group. However, when the coordinating group is attached to a side chain on the phenol nucleus, it may be a hydroxyl, amino, or oxo group attached through 3 carbons to the reactive phenolic hydroxyl group. It is necessary for the coordinating groups to be so situated in order to form a 5 or 6 membered chelate ring with the metal compound. A side chain amine group is preferably tertiary. The amine group may be of the primary, secondary or tertiary type in the other instances. Specific examples of hydroxy compounds which tend to react and form a stable chelated structure are: ethylene glycol, propylene glycol, trimethylene glycol, 1,3-butanediol, 2,3-butanediol, 2-methyl-1,3-pentanediol, 2,2-diethyl-1,3-propanediol, 2-ethyl-1,3-hexanediol, glycerol, mono- and diglycerides, 2-hydroxy cyclohexanol, 2-amino cyclopentanol, amino ethanol, amino-ethyl ethanolamine, diethanolamine, triethanolamine, 3-aminopropanol, 1-beta-aminoethyl propylene glycol, ortho-amino benzyl alcohol, 2-phenyl-3-amino propanol, N-(beta-aminoethyl)-aminoethanol, lactic acid, lactic amide, glycolic acid, glycolic amide, ethyl lactate, butyl glycolate, glycolic aldehyde, 1-butanol-2-one, 4-butanol-2-one, di-acetone alcohol, ortho amino phenol, ortho amino para-cresol, pyrocatechol, dihydroxy - naphthalene (1,2), 2-aminonaphthol-1, salicyclic acid, and acetoacetic ester (enol. form). These compounds all contain the reactive hydroxyl group as well as the critically located coordinating groups. It is quite clear that many more similar compounds may be used within the scope of this invention.

The simplest manner by which the product of this invention may be represented is in terms of the following chemical unit:

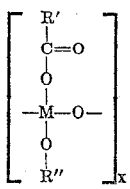

in which M is Ti or Zr,

is an acylate group of the acids described in column 4, line 66, to column 5, line 4, of this specification, and R″O— is an organo group of the hydroxy compound which has been substituted into the polytitanyl acylate or the corresponding zirconium compound. It should be understood that as the

groups of the above unit repeat themselves to form linear, branched and cyclic structures and combinations of the same, it will not necessarily follow that each of the units which form the molecule will contain one acylate group and one R″O— group. It is possible to have connected to some of the Ti or Zr atoms an OH, or RO— of the starting material which did not take part in the alcoholysis. Furthermore, it should be noted that different combinations of the above groups may be present on the repeating metal atoms. For this reason, the compounds of this invention are most accurately described by the above chemical unit accompanied by a recitation of the number of each of the attached groups, per metal atom.

The products of this invention contain from about 0.1 to 1.9 acylate groups per Ti or Zr atom with a preferred range being about 0.5 to 1. The newly substituted organo groups from the hydroxy compound are present in amounts ranging from about 0.1 to 1.9 per metal atom, and the preferred range is 0.5 to 1. If the amount of the hydroxy compound used in the reaction is insufficient to replace all the original RO— groups, the compound will contain these groups, or OH groups if the starting material is partially hydrolyzed, in an amount which is necessary to satisfy the tetravalency of the titanium or zirconium atoms and complete the molecule.

The reacting proportions for the process of this invention range from 0.1 mol of the hydroxy compound for each metal atom of the acylate to 1.9 mols per metal atom of the acylate. In actual practice, the weight of a single acylate polymer unit, containing the

nucleus and its attached groups, is determined. Then, an amount of an alcohol or phenol within the range of 0.1 to 1.9 mols is reacted with an amount of the acylate which is equivalent to the weight of said polymer unit. For example, isopropoxy polytitanyl stearate

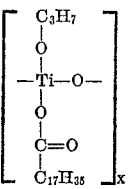

with a 1 to 1 ratio of stearate and isopropoxy groups has a polymer unit with a weight of 406, and from 0.1 to 1.0 gram mols of a hydroxy compound may be reacted with each 406 grams of isopropoxy polytitanyl stearate. In this particular example, 1.0 gram mols is the upper limit of the reacting proportions for the hydroxy compound since there is only one isopropoxy in each unit which is available for reaction with the hydroxy compound. The reaction of this invention proceeds without special conditions. When using hydroxy compounds which have a structure capable of forming a chelate, it may not be necessary to remove the co-product alcohol. However, the preferred method includes the removal of the co-product alcohol as is done with any other hydroxy compound so that the reaction may go to completion.

The novel products of this invention are those organo polytitanyl acylates or organo polyzirconyl acylates in which the organo group bonded to the metal through oxygen is a halogenated aryl or aralkyl group, or a group which contains a radical which is adapted to form a chelated structure with the metal. Examples of these new compounds are 2-aminoethoxy polytitanyl oleate having the unit structure:

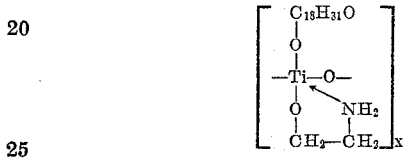

and pentachlorophenoxy polytitanyl stearate having the unit structure:

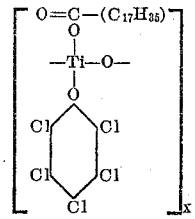

Other examples of my novel compounds include 4-chloro-2-methylphenoxy polytitanyl stearate with a 1 to 1 ratio of stearate and 4-chloro-2-methylphenoxy groups; a 2,4,6-tribromophenoxy polytitanyl laurate with a 1 to 0.5 ratio of laurate and 2,4,6-tribromophenoxy groups and a residue of 0.5 isopropoxy groups; pentachlorophenoxy polyzirconyl oleate with a 1 to 1 ratio of oleate and pentachlorophenoxy groups; 2,4-dichloro-1-naphthoxy polytitanyl butyrate with a 1 to 1 ratio of butyrate and 2,4-dichloro-1-naphthoxy groups; and p-chlorophenylmethoxy polytitanyl oleate with a 1 to 1 ratio of oleate and p-chlorophenylmethoxy groups.

The following examples will illustrate in more detail some of the specific applications of this invention without, however, limiting the general scope of this invention.

*Example 1*

Isopropoxy polytitanyl stearate was prepared by mixing and refluxing two gram mols of stearic acid in 1 liter of hexane with one gram mol of tetraisopropyl titanate for about 30 minutes. Two mols of isopropanol and the hexane were then distilled off. Heating was continued in vacuum distillation equipment until about 340 grams of isopropyl stearate were recovered. On cooling, a soft waxy residue of isopropoxy polytitanyl stearate, melting at about 68° C., remained 406 parts by weight of this isopropoxy polytitanyl stearate and 206 parts of octylphenol are mixed in a reaction vessel equipped with a distillation head. Upon mixing, the isopropanol starts coming off and is removed by distillation and vacuum stripping, the final temperature of the liquid still residue being 100° C. A total of 60 parts of co-product isopropanol is accumulated. The reaction product, octylphenoxypolytitanyl stearate, is a viscous dark cherry red liquid, useful as a dispersing agent for pigments in hydrocarbons or in paint systems.

*Example 2*

101 parts of isopropoxy polytitanyl stearate were dissolved in 120 parts of cyclohexane in a distillation vessel. 67 parts of stearyl alcohol were added and the mixture heated with stirring to dissolve the stearyl alcohol. The reaction mixture was then heated to a higher temperature until the isopropanol co-product was completely stripped off, the last traces thereof being removed under vacuum. The stearoxy polytitanyl stearate product is a waxy solid, and soluble in hydrocarbon solvents. It is useful as a wax in various combinations with hydrocarbon solvents.

*Example 3*

462 parts by weight of isopropoxy polytitanyl behenate were prepared by dissolving 284 parts of tetraisopropyl titanate in 750 parts of xylene in a distillation vessel, adding 340 parts of behenic acid, warming to dissolve the behenic acid, adding 18 parts of water in 100 parts of isopropanol, and stirring ten minutes. 270 parts of stearyl alcohol were then added to the isopropoxy polytitanyl behenate, and the mixture warmed to insure dissolving of the stearyl alcohol. The isopropanol co-product was collected by distilling and vacuum stripping, along with the solvent xylene. The still residue product, isopropoxy polytitanyl behenate, was a waxy solid, and useful as wax substitute.

*Example 4*

3.1 parts by weight of ethylene glycol were added to 40.4 parts of isopropoxy polytitanyl oleate with stirring, in a reaction vessel. The mixture was allowed to stand about 16 hours, producing a resinous solid material. This resinous material was then dissolved by adding xylene thereto. From this mixture the reaction co-product isopropanol was removed by distillation. The xylene solution of the ethylene glycol cross-linked polytitanate or ethyleneglycol polytitanyl oleate product solution thus produced is useful in film-forming compositions, particularly in corrosion-resistant metal coating compositions.

*Example 5*

64 parts by weight of a soya-modified pentaerythritol alkyd resin in a 40% solvent solution (said alkyd having a hydroxyl number of 80 and thereby being a polyalcohol), were reacted with 20 parts by weight of isopropoxy polytitanyl oleate by intimate mixing in a reaction vessel. The viscous mixture obtained was lowered in viscosity by the addition of 16 parts by weight of xylene, and it forms without further purification a useful film-forming composition. This composition when applied as a film coat on steel provided hard, tough, flexible, adherent films which give more effective corrosion protection than when the alkyd resin alone is used for such purpose.

*Example 6*

One mol (449 g.) of isopropoxy polyzirconyl stearate was mixed in a reaction vessel with one mol of phenol, and the mixture warmed to 40° C. to melt the phenol and accelerate interaction. One mol part of the co-product isopropanol formed in the reaction was removed from the vessel by distillation, leaving as a product a purple viscous oil, phenoxy polyzirconyl stearate.

*Example 7*

One gram mol of tetraisopropyl titanate (284 g.) was dissolved in 4 liters of heptane. One gram mol of oleic acid and 16 grams of water were added during agitation. The isopropanol displaced by the oleic acid and water was removed by distillation and the heptane lost in the process replaced. The heptane solution then contained approximately 48 grams of titanium in the form of isopropoxy polytitanyl oleate. This solution was added with agitation to 61 grams (1 mol) of ethanolamine. A spontaneous rise in temperature occurred. Approximately, 60 grams of isopropanol were then removed as the isopropanol-heptane azeotrope. The distillation was continued using reduced pressure until the solvent was removed. The solid residue weighed 431 grams and contained 11.1% by weight of Ti, and 3.25% nitrogen. The product was soluble in hydrocarbon solvents and substantially stable toward moisture. The above analyses show the product to contain substantially one nitrogen atom per titanium atom and it corresponds to 2-aminoethoxy polytitanyl oleate having the structure:

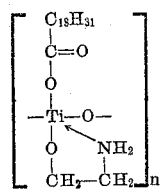

*Example 8*

A crude isopropoxy polytitanyl cocoanut acylate was prepared from tetraisopropyl titanate, water and the mixed fatty acids derived from cocoanut oil by procedures analogous to those used in Example 7 for the preparation of the isopropoxy polytitanyl oleate. One hundered grams of the polytitanate thus prepared were mixed with 26.7 grams of 2-aminobutanol dissolved in 200 ml. of heptane, the mixture becoming warm. 100 grams of a hydrocarbon lubricating oil were added and the volatile substances, heptane and isopropanol, distilled off at reduced pressure with a maximum pot temperature of 80° C. The resulting solution of 2-aminobutoxy polytitanyl cocoanut acylate was further diluted with lubricating oil and used as a crank case detergent.

*Example 9*

The preparation of Example 8 was repeated to give the product solution in 110 grams of lubricating oil. This solution contained about 14.5 grams of titanium as 2-aminobutoxy polytitanyl cocoanut acylate. 60 grams of lauric acid were mixed with this solution in which it dissolved and reacted to form the lauric acid salt of the amine. The product was insoluble in acetonitrile but soluble in hydrocarbon such as heptane. Substantially no lauric acid could be extracted from the product with acetonitrile.

*Example 10*

260 grams of butoxy polytitanyl stearate prepared as in Example 5 of U.S. Patent 2,621,195 where this material is called polymeric butyl titanium monostearate, were mixed with 73 grams (½ mol) of octylene glycol (2-ethyl hexane 1,3-diol) and warmed to cause solution and reaction. Butanol was removed by distilling under reduced pressure; 36.5 grams of the alcohol being recovered from a cold trap in the system. The pot residue was a yellow waxy solid containing about 10% Ti corresponding closely to the theoretical value for octylene glycol polytitanyl stearate.

*Example 11*

383 grams of tetrabutyl zirconate were dissolved in cyclohexane. 16 grams of water were added slowly with vigorous agitation and the agitation continued until the solution became clear on brief standing. 132 grams of butyric acid dissolved in cyclohexane were added to the polytitanate solution and the mixture agitated 15 minutes. A small rise in temperature occurred indicating chemical reaction. The mixture was then heated and a distillate containing butanol removed while cyclohexane was replaced to maintain a 200 millimeter volume. Distillation was continued until pure cyclohexane was distilling at 80° C. The pot residue was allowed to cool to room temperature, and 54 grams of orthoaminophenol added. Again a slight temperature rise occurred indicating a reaction. On evaporation of solvents more butanol was removed with the cyclohexane. The product remaining was a purple viscous mass soluble in hydrocarbon oils and in the common alcohols, and substantially insoluble in and stable toward water. A water washed, vacuum dried sample had a weight analysis as follows: Zr 31.0%, C 38.4%, H 6.0%, N 2.4%. This corresponds to a polymer having approximately 1½ mols of butyric acid and ½ mol of the amine per atom of zirconium which may be called 2-aminophenoxy polyzirconyl sesquibutyrate.

*Example 12*

325 grams of butoxy polytitanyl stearate having approximately one stearate group per titanium atom were dissolved in heptane in a reaction flask equipped with agitator and still head. 150 grams of triethanolamine was added slowly during agitation and heat was evolved. When the reaction had subsided, external heat was applied and the solvent distilled off. The first portion of distillate appeared at about 93–94° C. as an azeotrope containing 18% butanol. The final solvent was removed by vacuum stripping. Enough butanol was recovered to account for substantially all the butyl groups of the starting material. The product, analyzing 2.8% nitrogen and 9.7% Ti, is a triethanolamine polytitanyl stearate having one stearate and one of the triethanolamine groups per Ti atom. It was only slowly decomposed by water at room temperature. The fatty acid amine salts of this material were more water stable. Both the triethanolamine polytitanyl stearate and its acid salts were excellent dispersing agents in organic systems such as printing inks.

*Example 13*

100 grams of isopropoxy polytitanyl stearate having approximately one stearate radical per titanium atom and containing approximately 15% Ti were dissolved in dry hexane. 82 grams of pentachlorophenol were added to the titanate solution during agitation and heated to reflux temperatures under a distilling column. A reddish color began developing upon mixing which indicated the formation of a phenyl titanate. After addition was completed, the distillate was taken from the column at a head temperature ranging from 61° C. to 65° C. The distillate was a hexane-isopropanol azeotrope. The distillation was then continued at reduced pressure until a non-volatile orange-red residue remained which solidified to a rubbery material on cooling. The residue was soluble in cyclohexane and other hydrocarbons to a limited extent and its analysis showed the atomic ratio of chlorine to titanium to be 5. This corresponds to a polymer having the unit structure:

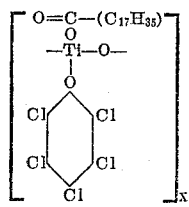

*Example 14*

Isopropyl tetratitanate was prepared by reacting 114 grams of tetraisopropyl titanate dissolved in cyclohexane with 18 grams of anhydrous acetic acid in 100 ml. of cyclohexane. The solutions were slowly mixed while stirring and while care was taken to protect the mixture from moisture. The isopropyl alcohol and isopropyl acetate were then removed from the reaction by evaporation under reduced pressure and temperature not over 40° C. To the resulting solution of the tetratitanate were added 85 grams of stearic acid and the mixture warmed briefly to 40° C. and again vacuum stripped. About 18 grams of isopropanol were recovered in the azeotropic mixture. The residual solution hepta-isopropoxy tetratitanyl tristearate was treated by mixing with 186 grams of pentachlorophenol for 30 minutes. The solvent and by-product isopropanol were then vacuum stripped from the product at temperatures not over 50° C. leaving a red material. Analysis showed this material to be hepta-pentachlorophenoxy tetratitanyl tristearate having the empirical formula $$(C_6Cl_5O)_7(C_{17}H_{35}CO_2)_3Ti_4O_3$$

The amine chelated products of this invention are considered especially interesting in that although they are fairly water-stable, they produce an alkaline reaction when in contact with, or dissolved in water. This alkalinity can be reduced or adjusted by forming the amine salts of the compound, such as the fatty acid amine salts or the corresponding salts of any other acid. The addition of acids until the pH is in the range of from 6.5 to 10 will yield the salts of the amine chelates of this invention. Although the complex structure formed between the amine nitrogen and the acid would seem to weaken the chelate structure; nevertheless, the resulting acid modified products are relatively water-stable. These salts of the amine chelated acylates are novel compositions of matter. The acids useful in forming these salts include carboxylic acids, especially the fatty acids heretofore described in this specification and the water-soluble inorganic acids such as sulfuric, phosphoric, hydrochloric, hydrobromic, carbonic, sulfamic, and the like. Such salts or acid-amino complexes can be adjusted with respect to pH in water systems and hence find use as surface active agents. When the acyl groups are large and in abundance, these products are oil-soluble, but when low molecular weight acyl groups are preponderant and the compound is not too highly condensed, these salts are water-soluble.

The process of this invention finds use in the preparation of coatings. The interaction of an alkoxy polytitanyl acylate with a polyhydroxy compound such as alcohol or partially hydrolyzed polyvinyl acetate or an alkyd resin will produce tough adherent coatings. The reaction mixture may be prepared in the presence of diluents or solvents. This solution may then be applied to a surface, and the alcoholysis promoted by shifting the equilibrium of the reaction through the evaporation of the co-product alcohol.

This invention makes it convenient to replace the alkyl group of a commercial alkoxy polytitanyl acylate with radicals which will give the acylate fungicidal or other biochemical properties. Furthermore, the process of this invention offers distinct advantages in preparing previously recognized acylates. Under one prior art method, tetrastearyl titanate is prepared and then reacted with oleic acid and water in order to prepare stearoxy polytitanyl oleate. This procedure would involve a displacement of stearyl alcohol or stearyl oleate from the reaction mixture, but this step is rather difficult due to the low volatility of these co-products. However, by the process of this invention one would prepare isopropoxy polytitanyl oleate by the relatively easy reaction between tetraisopropyl titanate, oleic acid, and water. This product can then be reacted with the desired amount of stearyl alcohol and the resulting isopropyl alcohol easily removed.

The embodiments of the invention in which an exclusive property or privilege is claimed are defined as follows:

1. As a new composition of matter, polymeric group IV-A metal compounds in which the polymeric chain is formed by repeating

groups where M is selected from the group consisting of Ti and Zr, said

groups having the following chemical groups connected to the metal atom through oxygen: 0.1 to 1.9 acyl groups per metal atom, said acyl group being of a monocarboxylic acid having from 4 to 24 carbon atoms; 0.1 to 1.9 organo radicals selected from the group consisting of (a) hydroxyethyl and 2-ethyl-3-hydroxyhexyl radicals wherein the hydroxyl group chelates with the metal atom to form a 5–6 membered chelate ring; and (b) 2-aminoethyl, bis(2-hydroxyethyl) aminoethyl, o-aminophenyl, 2-aminobutyl, 3-aminopropyl, wherein the amino group chelates with the metal atom to form a 5–6 membered chelate ring, the remainder of the molecule being radicals selected from the group consisting of alkoxy radicals containing from 1 to 8 carbon atoms and hydroxyl radicals and combinations thereof connected directly to the metal atom.

2. The composition of matter of claim 1 in which M is titanium.

3. The composition of matter of claim 2 in which the acylate group is a stearate group.

4. The composition of matter of claim 2 in which the organo radical is the 2-aminoethyl radical.

5. The composition of matter of claim 2 in which the organo radical is the 2-ethyl-3-hydroxyhexyl radical.

6. Composition in which oxygen-titanium linkages replace some co-valently bonded groupings of a $\beta$-aminoalkyl acyl titanate composition, the number of replacements of the co-valently bonded groupings by the oxygen-titanium linkages being from 1 to 3 per titanium atoms said composition thus forming a polymeric structure, said $\beta$-aminoalkyl acyl titanate composition comprising quadrivalent titanium co-valently bonded with 4 moles of organic groupings selected from the group consisting of $\beta$-amino alkoxy, acyloxy, and lower alkoxy, said alkoxy grouping being a saturated lower aliphatic hydrocarbon, said acyloxy grouping containing only one carboxyl group and having from 4 to 20 carbon atoms, said acyloxy grouping selected from the group consisting of saturated and unsaturated aliphatic and aromatic groupings, said aminoalkoxy group having the formula of compounds selected from the group consisting of ethanolamine, diethanolamine, triethanolamine, and N-(beta-amino-ethyl)-aminoethanol, said acyloxy groupings being present in the polymeric structure in an amount from 0.1 to 1.9 moles for each mole of titanium, said aminoalkoxy groupings being present in the polymeric structure in an amount from 0.1 to 1.9 moles for each mole of titanium, the remainder of the molecule being said alkoxy groupings.

References Cited in the file of this patent

UNITED STATES PATENTS

| | | |
|---|---|---|
| 2,621,193 | Langkammerer | Dec. 9, 1952 |
| 2,621,195 | Haslam | Dec. 9, 1952 |
| 2,680,108 | Schmidt | June 1, 1954 |
| 2,681,922 | Balthis | June 22, 1954 |
| 2,689,858 | Boyd | Sept. 21, 1954 |
| 2,736,666 | Beacham | Feb. 28, 1956 |
| 2,750,307 | La Berge | June 12, 1956 |

OTHER REFERENCES

Bradley et al.: J. Chem. Soc. (London), June 1952, pages 2027–2032.